United States Patent [19]

Zick

[11] Patent Number: 5,063,022

[45] Date of Patent: Nov. 5, 1991

[54] METHOD FOR UNIAXIAL HIP COMPACTION

[75] Inventor: Daniel H. Zick, Andover, Mass.

[73] Assignee: Industrial Materials Technology, Inc., Andover, Mass.

[21] Appl. No.: 631,083

[22] Filed: Dec. 19, 1990

[51] Int. Cl.⁵ .............................................. G22F 1/00
[52] U.S. Cl. ..................................... 419/49; 264/125; 264/332
[58] Field of Search ................... 419/49; 264/125, 332

[56] References Cited

U.S. PATENT DOCUMENTS 4,747,999  5/1988  Hasselstrom ........................ 419/49

Primary Examiner—Stephen J. Lechert, Jr.
Attorney, Agent, or Firm—Lahive & Cockfield

[57] ABSTRACT

The invention includes an apparatus and method for hot isostatic compaction of compactible material in a heated and pressurized environment within a pressure vessel, having a compaction container which can be hermetically sealed over a load, and which can transmit pressure from the pressure vessel to the load sealed in the container, a compaction die which can be hermetically sealed within the container, the die having an interior wall area which defines within the die an internal cavity having a width measured along a first axis, the die interior wall area extending along a second axis transverse to the first axis to generally define the height of the die cavity, the die having a wall thickness measured along the first axis, and a punch arrangement for applying compacting force to the compactible material and having a width essentially equal to the die cavity width such that when the punch arrangement is loaded oriented along the first axis within the die cavity, respective ends of the punch arrangement contact the die interior wall area, the die wall thickness being selected according to the separation between portions of the punch arrangement, such that pressure on the container will force the punch arrangement to travel along the second axis to compact the loaded compactible material charge along the second axis.

4 Claims, 2 Drawing Sheets

METHOD FOR UNIAXIAL HIP COMPACTION

BACKGROUND OF THE INVENTION

This invention relates to hot isostatic processing of compactible materials.

Uniaxial compaction in a heated die set (i.e. hot pressing), is a popular method of compacting metals, ceramics, and composites because of the economy with which shapes of accurate dimensions can be formed. The uniaxial compaction also offers benefits in the compaction of composite materials with planes oriented at right angles to the compaction axis. Pressing composites with this method avoids buckling of the fibers which could accompany an isostatic compaction technique. Because of the necessary pressures required for compaction of many materials, hot pressing is restricted to compaction of components of fairly small dimensions. As a practical matter, hot pressing is tonnage limited, i.e., the amount of compaction force per unit area (pressure) which can be delivered is tied to the size of the press.

Isostatic pressing generally is used to produce compacts in near net sizes and shapes of varied complexity, and is not tonnage-limited. Hot isostatic pressing (HIP) is performed in a gaseous atmosphere at substantially elevated temperatures, contained within a pressurization vessel. The pressure applied to the compacted material is the pressure in the HIP vessel, typically 15,000 psi. Initially, the charge to be pressed is placed or poured into and hermetically sealed within a receiver which is rigid at room temperature and then is enclosed within the pressurization vessel. The receiver, typically made of steel or other ductile metals, isolates the charge from the gaseous environment. The receiver deforms plastically under pressure at elevated temperatures, whereby the charge is simultaneously isostatically compacted and bonded. HIP produces complexly shaped compacts at near net shape with uniform density, and permits the fabrication of components 50-100 times greater in area than possible with mechanical pressing.

SUMMARY OF THE INVENTION

The present invention combines the advantages of the uniaxial compaction of hot mechanical pressing with the capacity advantages of HIP. As a result, a new HIP process is provided with uniaxial compaction wherein components of complex shapes and high length to width ratios can be fabricated in much larger dimensions than previously available with either process alone. Uniaxial compaction of a material charge is imposed by punches in a die, which translate the pressure from the pressure vessel into uniaxial compaction. The compaction apparatus is configured such that the punches support the die, regardless of the size of the die cavity. Therefore, die wall thickness is a function of punch separation. In the prior art, die wall thickness is a function of die cavity size, not punch separation.

An embodiment of the invention includes an apparatus for hot isostatic compaction of compactible material in a heated and pressurized environment within a pressure vessel. The apparatus includes a compaction container adapted to transmit pressure from the pressure vessel to a load sealed in the container, a compaction die of a size which can be sealed within the container, the die having an interior wall area which defines within the die an internal cavity having a width measured along a first axis, and a punch arrangement. The punch arrangement includes upper and lower punches for applying compacting force to a compactible material sealed with the die and punches in the container. The punch arrangement has a width essentially equal to the die cavity width, such that when the punches are loaded oriented along the first axis within the die cavity, respective ends of the punches contact the die interior wall area. The die has an arrangement for transferring external compressive forces through the die to the punches, wherein, if the die cavity is loaded with the punches and a compactible material charge and the loaded die is sealed within the container and the container is submitted to pressure in a pressure vessel, the submitted pressure will force the punches to travel transverse to the first axis to compact the loaded compactible material charge.

The apparatus may further include a friction reducing arrangement (such as a thin and flexible foil sheet) for minimizing the friction between the punches and the die interior wall area, such as where the die interior wall area defines a slip plane extending transverse to the first axis to enable the punches sliding along the slip plane during compaction of the loaded compactible material charge.

In another aspect of the invention, a method for hot isostatic compaction of compactible material in a heated and pressurized environment within a pressure vessel, includes the steps of placing a compaction die within a compaction container, the die having an interior wall area which defines within the die an internal cavity having a width measured along a first axis, and placing within the die cavity a compactible material charge and punches for applying compaction force to the compactible material charge, the punches having a width essentially equal to the die cavity width such that when the punches are loaded oriented along the first axis within the die cavity, respective ends of the punches contact the die interior wall area, the die wall thickness being selected according to the degree of contact of the punches with the die interior wall area, whereby, if the loaded die is sealed within the container and the container is submitted to pressure in a pressure vessel, the submitted pressure will force the punches to travel transverse to the first axis to compact the loaded compactible material charge.

Generally the first of the two punches is loaded at the top of the die cavity and the second punch is loaded at the bottom of the die cavity and the compactible material charge is loaded between the two punches. The two punches are separated from each other by a separation gap, whereby the die wall thickness is selected according to the dimension of the separation gap between the two punches. The die and punches each are cooperatively formed of compatible materials which create a low coefficient of friction between the die and punches. Preferably both of the punches are displaced by the applied fluid compaction pressure. The punches may include a non-planar compression surface on a first punch for forming a shaped part in conjunction with a second punch. Possibly, the second punch is non-planar.

Other embodiments are as described below and in the claims.

DETAILED DESCRIPTION OF THE PREFERRED EMBODIMENT

Figure 1:
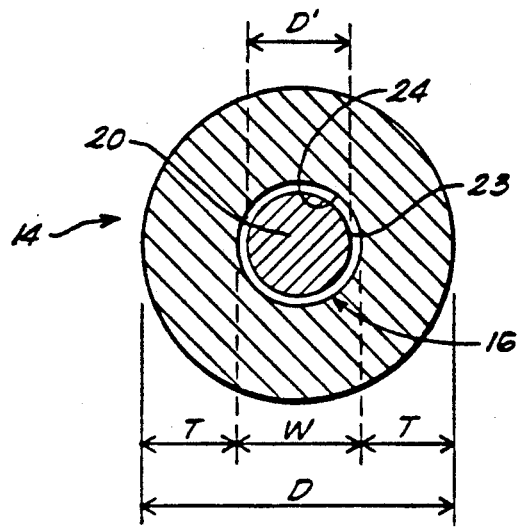
FIG. 1 is a top view of a prior art HIP uniaxial die.
Figure 2:
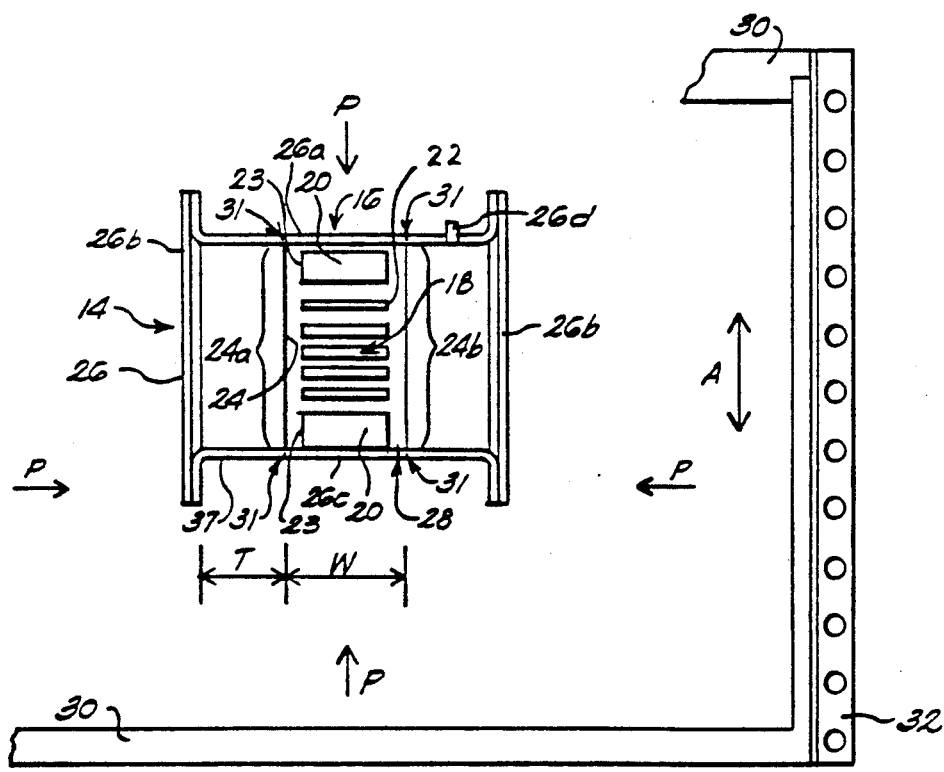
FIG. 2 is a cross-section of a prior art compaction container with a loaded prior art die.

A known HIP compaction arrangement is shown in FIGS. 1 and 2, where a die 14, such as a cylindrical or a rectangular die, is contained within a pressure transfer container 26. Die 14 has an outer dimension D and an inner cavity 16 of width W for receipt of the material charge to be compacted and for receipt of at least one punch 20 of dimension D'. This charge may include powdered material to be compressed into a densified compact, powder on a block of material for cladding the powder to the block, or a series or stack of plates of composite material which can be fused together for diffusion bonding, for example.

A prior art diffusion bonding arrangement of plates 18 is shown in FIG. 2. This assembly includes a punch 20 at each end of cavity 16. Container 26, including top 26a, sides 26b, and bottom 26c, and an evacuation tube 26d welded to cover 26a, and serves to enclose the die, plates to be fused and punches in a hermetically sealed, out-gassed environment.

The loaded and charged container 26 is placed into and sealed within a pressurization vessel 30. Pressurized fluid (such as argon gas) is then pumped into the vessel and the material charge (e.g., the group of plates 18) is compressed according to the pressure P (typically about 15,000 psi) delivered to the material charge via punches 20. A conventional heating apparatus, such as furnace 32, raises the temperature of the charge typically to about 800° to 3000° F., during compaction.

Contrary to pure isostatic pressing, where the powder charge is compressed uniformly in all directions, in the above discussed HIP process the isostatic pressure from the pressurization fluid is translated into an essentially axial compression of the punches into the charge along compression axis A. This arrangement mandates the thickness T of the die walls be selected to withstand the external fluid pressure without noticeable flexing into the compression axis A so as not to interfere with the punches as they are being displaced along axis A by the fluid pressure.

For this reason, some free space 28 is required between the ends 22 of plates 18 and the ends 23 of punches 20, on the one hand, and the die wall interior surface 24, on the other hand. This enables compaction of the charge by the punches inwardly toward the center of the cavity along the cavity compaction axis without frictional drag of the punches or plates on the wall interior surface. Hence, the greater the cavity width W, the greater the wall surface area and the greater the required die wall thickness T to prevent unwanted die wall deflection into the punches, for a given fluid pressure, because the die walls support the fluid pressure in the pressure chamber.

In practice of the present invention, as shown in FIG. 3, die 40 again having a width D includes a die cavity 50 having a width W'. The punches 41 extend at their ends 43 up to and in contact with the inner die wall 44 of die 40. Hence, the punches (also having a width W') serve as the support members, bearing the external compressive forces transferred by the die walls to the punches. Thus the punches relieve the conventional die wall thickness requirement discussed above. Consequently, the die 40, with thinner walls (a smaller dimension T'), can be employed in practice of the present invention. As a result, for a given pressurization vessel 30 and die outside diameter D, a greater usable inside diameter equal to a cavity width W' is made available. This enables producing larger cross-section parts for the same capacity pressurization vessel, and hence, better utilization of the vessel volume.

Figure 3:
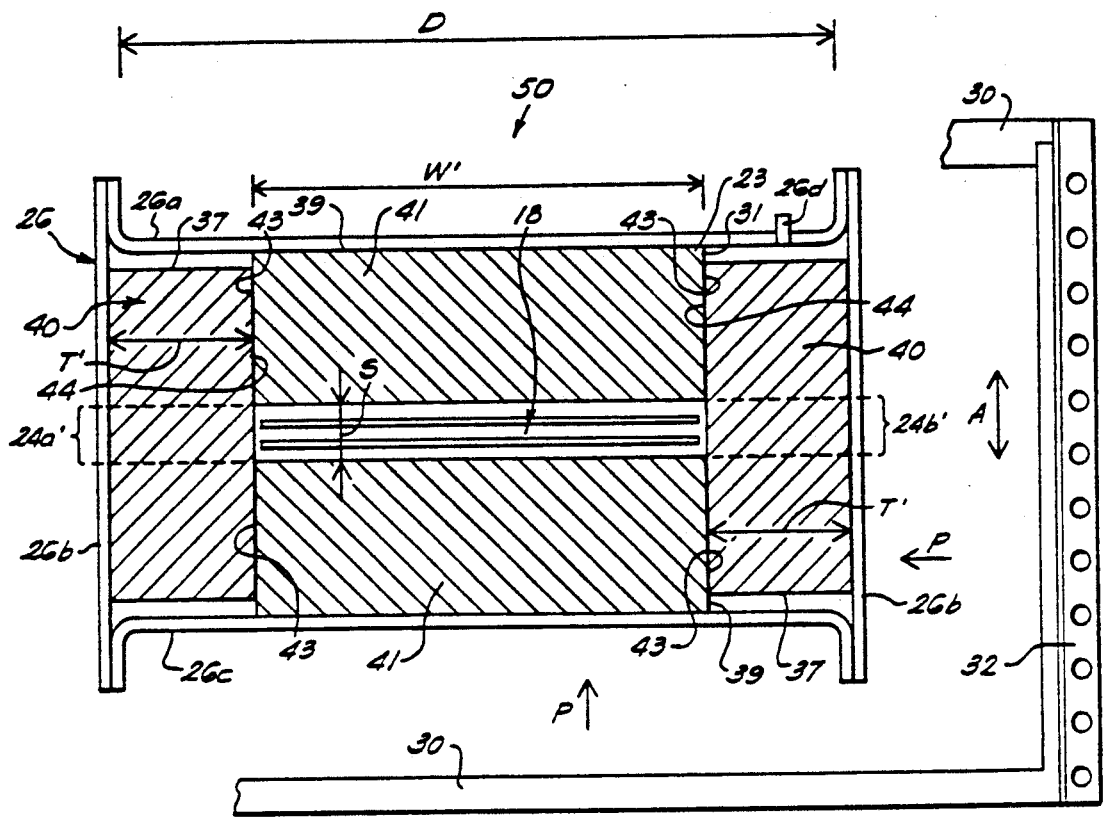
FIG. 3 is a side view of a die and material charge loaded in a compaction container in practice of the present invention, prior to compaction.
Figure 4A:
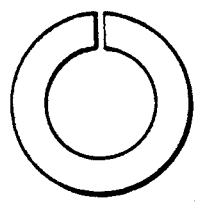
FIGS. 4a, b, c show a circular split die, rectangular chase around die, and a triangular picture frame die, respectively.
Figure 4B:
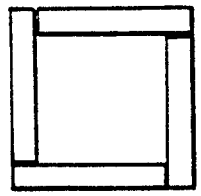
Figure 4C:
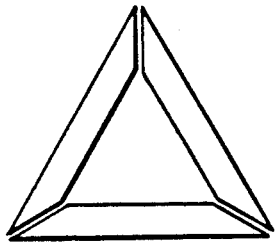

In practice of the invention, a split die is configured to transfer external compression forces to the punches. Other arrangements are also within the scope of the invention. FIGS. 4a, b, c are top views of a alternative embodiments of the arrangement of FIG. 3. These show a split round die, a chase around die and a triangular picture frame die, all of which transfer external compression forces to the punches. Other arrangements are also within the scope of the invention. (In a conventional arrangement these dies would be encased in a containment ring to withstand the internal pressures from uniaxial pressing. Such containment is not required in the present invention.)

In FIG. 2, the die wall thickness T is related to the width W of the cavity: the larger the cavity the thicker the die walls must be. In the invention of FIG. 3, the die wall thickness T' is related to the separation S of the punches.

More particularly, the benefits of the invention may be understood by viewing like segments of dies 14 and 40. In the prior art of FIG. 2, free space 28 exists and must be maintained between punches 20 and the die wall interior surface 24. Hence all of die wall beams 24a, 24b must bear the unit force from the applied pressure P without support from punches 20. As the die is increased in size to increase the cavity area, then the die walls must be strengthened (i.e., made thicker) to withstand the greater amount of force distributed over its greater cross-section. As the die walls are made thicker, then the usable area within the pressurization vessel 30 is reduced.

In FIG. 3, shown prior to compaction, with the ends 43 of punches 41 bearing against the die inner walls 44, shorter beams 24a', 24b' are defined by the amount of separations of the punches from each other. Thus the die wall beams are shortened and are supported. For a given applied compaction pressure and die wall thickness, these shorter beams 24a', 24b' result in lesser inward deflection (normal to the compaction axis) of the die walls compared to the unforeshortened beam configuration of FIG. 2. Accordingly, in the present invention, the dependency of the thickness of the die walls upon cavity width is severed. Rather, die wall thickness T' is now governed by the separation S of the unsupported beams 4a', 24b'. Therefore, die wall thickness is determined according to the compression expected to be applied to beams 24a', 24b'.

As the punch separation S is reduced, so are beams 24a', 24b', and so then is the die wall thickness requirement. Now better utilization of the pressurization vessel volume is obtained. In particular, use of thinner die walls enables use of dies with larger width cavities for the same die material and die outer diameter. Hence, the present invention enables use of thinner-walled dies with larger width cavities to permit compaction of larger cross-section compacts for a given capacity pressurization vessel. Since HIP pressurization vessels are both large and expensive to build, the present invention provides a very desirable and inexpensive manner of effectively increasing capacity of the pressurization vessel.

A benefit of the present invention may be illustrated by example. In practice of the present invention, such as in the configuration of FIG. 3, where the unsupported die beam 24a', 24b' (i.e., defined by the separation S between the punches) is $\frac{1}{2}"$, then a die having a $1\frac{1}{2}"$ wall thickness could be employed to compress a $1' \times 1' \times \frac{1}{2}"$ or a $4' \times 4' \times \frac{1}{2}"$ thick layup of composite panels, or any other layup with die beams of $\frac{1}{2}"$, to a net thickness of $\frac{1}{4}"$, for a given temperature and pressure and a reasonable die height. In the contrary, in the prior art of FIG. 2, a layup of composite panels $1' \times 1' \times \frac{1}{2}"$ compressed to a net thickness of $\frac{1}{4}"$ would require a die wall thickness of about two feet, and to compress a $4' \times 4' \times \frac{1}{2}"$ thick layup to a net thickness of $\frac{1}{4}"$ would require a die wall thickness of so many feet as to be impractical.

Figure 5:
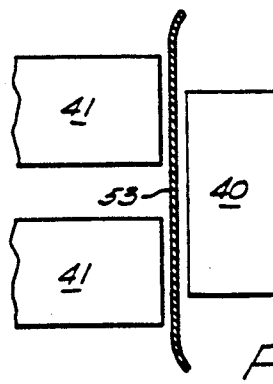
FIG. 5 is a partial side view of a foil slip plan in practice of the present invention.

The present invention must accommodate the frictional drag between the die walls and punch ends if the punches are to contact and support the die walls while the punches are being displaced along axis A by the compaction pressure P. In fact, a preferred combination of die and punch material is selected so as to minimize sliding friction between the walls and punch ends as the punches travel along axis A. In addition, a slip plane, e.g., a thin foil sheet 53, as shown in FIG. 5, may be employed between the punches and die inner wall to enhance their sliding interaction.

Graphite is the preferred material of choice for the die and punches (such as Stackpole grade 2020) because it has strength at temperature, a low coefficient of friction, and is metallurgically compatible with many process materials. In any event, a combination of materials should be selected so that the punch can slide along the die walls even under pressure. Also, a titanium container 26 (such as 16 gauge C.P. titanium, grades 1 or 2) is preferably employed to avoid material interaction with the graphite at temperatures above about 1900 degrees F. Steel containers may be employed at lower temperatures.

As a final note, it is observed that some care must be taken to prevent tearing of container 26 at the junction of the ends 23 of the punches and the inner corners 31 of the die. This situation arises because container 26 can become over stretched across die corners 31 as the punches are forced inwardly along the compaction axis. Overstretching of the container can cause it to puncture, which ends the compaction. To avoid this, the travel of the punches should be limited to a safe range.

In one illustrative embodiment, this limitation may be achieved by adjusting the die travel to be calibrated about the die outer surfaces 37 by employing a punch and charge combination which elevates (by some reasonable distance) the punch outer portion 39 of each punch beyond the plane of the die outer (top and bottom) surfaces 37 prior to compaction and which locates the punch portion 39 nearly flush with the plane of the die outer surfaces 37 after compaction. Some experimentation may be required to optimize the punch compaction travel which is acceptable in a given case.

Other embodiments are within the following claims.

What is claimed is:

1. A method for hot isostatic compaction of compactible material in a heated and pressurized environment within a pressure vessel, the method comprising
   (a) placing a compaction die within a compaction container, the die having an interior wall area which defines within the die an internal cavity having a width measured along a first axis, and
   (b) placing within the die cavity a compactible material charge and punch means for applying compaction force to the compactible material charge, the punch means having a width essentially equal to the die cavity width such that when the punch means is loaded oriented along the first axis within the die cavity, respective ends of the punch means contact the die interior wall area, the die wall thickness being selected according to the degree of contact of the punch means with the die interior wall area,
   whereby, the loaded die is sealed within the container and the container is submitted to pressure in a pressure vessel, the submitted pressure forcing the punch means to travel transverse to the first axis to compact the loaded compactible material charge.

2. The method of claim 1 wherein the punch means comprises two punches, wherein a first of the two punches is loaded at the top of the die cavity and the second punch is loaded at the bottom of the die cavity and the compactible material charge is loaded between the two punches.

3. The method of claim 2 wherein the two punches are separated from each other by a separation gap, whereby the die wall thickness is selected according to the dimension of the separation gap between the two punches.

4. The method of claim 1 wherein the die and punch means each are cooperatively formed of compatible materials which create a low coefficient of friction between the die and punch means.

* * * * *